Patented May 20, 1947

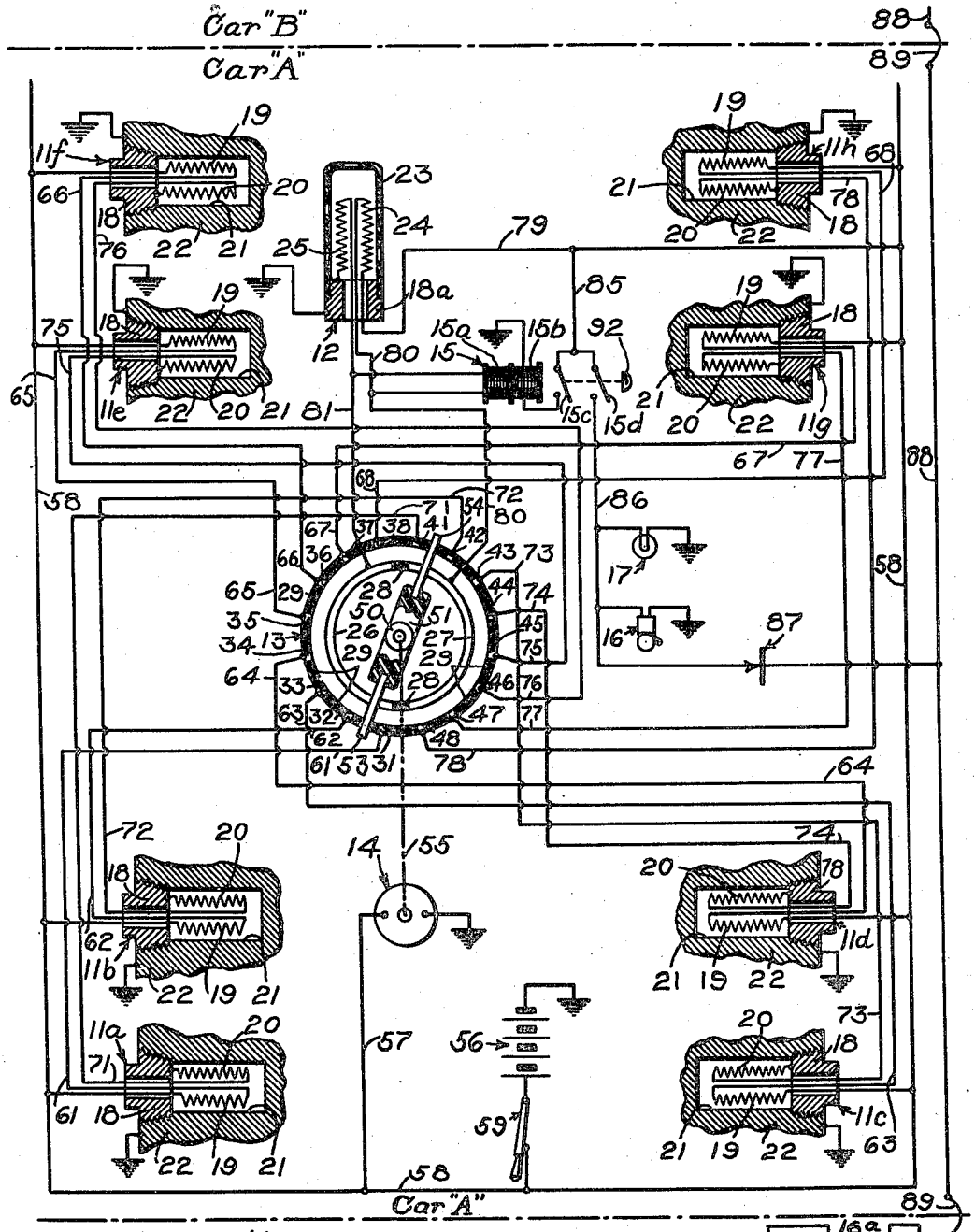

2,420,969

UNITED STATES PATENT OFFICE 2,420,969

HOT JOURNAL ALARM APPARATUS

George K. Newell, near Pitcairn, Pa., assignor to The Westinghouse Air Brake Company, Wilmerding, Pa., a corporation of Pennsylvania Application June 9, 1944, Serial No. 539,468

2 Claims. (Cl. 177—311)

This invention relates to hot journal alarm apparatus, that is, apparatus for giving a signal or an alarm whenever a bearing or journal approaches an abnormally hot temperature condition, and has particular relation to hot journal alarm apparatus for railway cars and trains.

Railroads have long sought a simple and inexpensive apparatus for apprising the engineer or other member of a train crew of the occurrence of a "hot-box" or abnormally high heat condition in the axle journal on any of the cars of the train, because hot-boxes not only damage the parts of the journals but may even result in breakage of an axle and possible wreckage of a train due to derailment of a car following breakage of the axle.

Various devices and apparatus have been proposed for the purpose of signaling the occurrence of a hot-box on railway cars and trains. For example, in my copending application, Serial No. 528,710, filed March 30, 1944, and assigned to the assignee of this application, I have disclosed a hot journal alarm apparatus employing for each individual axle journal a Wheatstone bridge arrangement of resistors, two of the resistors of the bridge circuit being exposed to the heat in the axle journal and the remaining two of the resistors being exposed to an external or ambient temperature as, for example, that in the car body. A relay is connected in such a manner as to be responsive to the unbalanced voltage created in the Wheatstone bridge circuit by reason of an abnormal increase in the resistance of the two resistors located within the axle journal due to an abnormal rise of temperature in the journal. Visual and audible signal devices both on the individual car and on the locomotive are actuated in response to the operation of the relay.

It is an object of my present invention to provide a hot journal alarm system of the Wheatstone bridge type disclosed in my copending application, Serial No. 528,710, and further characterized by an improved arrangement which simplifies the construction and reduces the cost thereof.

More specifically, it is an object of my present invention to provide a hot journal alarm apparatus of the Wheatstone bridge type wherein an indication of an abnormal heat condition in an axle journal is obtained on the basis of the creation of at least a certain predetermined unbalanced voltage condition in the Wheatstone bridge circuit and further characterized by the provision of a master resistance cartridge or unit exposed to an external or ambient temperature and means for successively associating such master resistance cartridge with each of a plurality of resistance cartridges associated directly with a plurality of corresponding axle journals.

It is a further object of my present invention to provide hot journal alarm apparatus of the type indicated in the foregoing objects and further characterized by a rotary selector switch for successively associating the master resistance cartridge with each of a plurality of axle associated resistance cartridges.

The above objects, and other objects of my invention which will be apparent hereinafter, are attained by means of apparatus subsequently to be described and disclosed in the diagrammatic plan view constituting the single figure of the accompanying drawing.

Description

Referring to the single figure of the drawing, the alarm apparatus of the hot journal alarm apparatus disclosed therein is indicated as applied to a locomotive and two cars, designated car "A" and car "B" respectively. The apparatus for car "B" duplicates that shown for car "A" and is accordingly omitted, for simplicity, from the drawing. The apparatus for car "A" includes a plurality of resistance cartridges $11a$, $11b$, $11c$, $11d$, $11e$, $11f$, $11g$, and $11h$, each associated with a corresponding journal box or casing of two four-wheel trucks located at opposite ends of the car.

The apparatus also includes a master resistance cartridge $12$; a rotary selector switch $13$ effective to successively associate the master resistance cartridge $12$ with the journal-associated cartridges $11a$ to $11h$, respectively, in a Wheatstone bridge arrangement hereinafter to be more fully described; and a suitable motor $14$, illustrated as of the electric type, for operating the rotary selector switch $13$.

The apparatus further includes a two-winding relay $15$ of the manually reset type which serves to control the circuit of signal devices in the form of an alarm bell or buzzer $16$ and a signal lamp $17$ on the car, and an alarm bell $16a$ and a signal lamp $17a$ located on the locomotive.

Considering the parts of the apparatus in greater detail, the journal-associated resistance cartridges are of the type shown and described in detail in my prior copending application, Serial No. 528,710. Since reference may be had to my said copending application for details of the construction of these resistance cartridges, they are shown only diagrammatically herein. For purposes of the present application, it is deemed sufficient therefore to point out that each resistance cartridge 11a to 11h comprises a support in the form of a screw plug 18 and two resistors or resistance elements 19 and 20, respectively, each of which may be in the form of a coil and disposed respectively on two concentrically supported insulating sleeve elements (not shown) attached to the plug 18. The plug 18 of each of the resistance cartridges is screwed into the outer threaded end of a bore or heat well 21 provided in a suitable location in the metallic portion of the corresponding journal box or casing 22 in such a manner as to expose the resistors 19 and 20 to the heat condition in the journal.

The master resistance cartridge 12 is similar in construction to the journal-associated resistance cartridges but differs therefrom essentially in that it is provided with a support 18a, corresponding to the screw plug 18, and a sleeve type perforated housing 23 attached, as by a screw connection, to the support 18a in such a manner as to enclose the resistance elements 24 and 25 of the master resistance cartridge. The resistance elements 24 and 25 of the master resistance cartridge 12 may be in coil form and carried respectively on corresponding tubular insulating elements disposed in concentric relation and suitably attached to the support 18a in the manner fully disclosed and described in my copending application, Serial No. 528,710.

The rotary selector switch 13, as diagrammatically shown, may comprise two concentrically arranged contact rings disposed in a common plane, the inner ring having two substantially semi-circular contact segments 26 and 27 separated at the ends thereof by a pair of short insulating segments 28. The outer ring comprises a series of short contact segments, illustrated as sixteen in number and designated 31, 32, 33, 34, 35, 36, 37, 38, 41, 42, 43, 44, 45, 46, 47, and 48 in succession around the periphery of the ring. Suitable insulating segments 29 are interposed between successive contacts 31 etc. to 48 respectively, which insulating segments are preferably flush with the contact face of the contact segments.

The rotary selector switch 13 further includes a rotary shaft 50 and an insulating member 51 fixed thereon. At each of the diametrically opposite ends of the member 51 is secured a metallic contact bridging element 53 and 54, respectively. The contact bridging elements 53 and 54 are resilient and flexible and are so disposed as to firmly engage and bridge the concentric contact rings at diametrically opposite points simultaneously.

The shaft 50 is suitably connected to and driven by the rotary element of the motor 14, as indicated by the broken line 55. The motor 14 may be of any suitable type, but I prefer to employ a motor of the periodically energized type, similar in principle to electric clocks of the periodically energized type, so that the motor 14 may be driven continuously with a minimum drain of energy from the battery 56 located on the car. In the case of passenger cars, the battery 56 may be the usual car lighting battery adapted to be maintained charged by an axle-driven generator provided on the car.

The circuit for supplying energy from the battery 56 to the motor 14 will be readily apparent from the drawing. One terminal of the motor is connected to the negative or grounded terminal of the battery 56, as through a ground connection in the manner shown, and the other terminal of the motor 14 is connected by a wire 57 to a so-called positive battery wire 58 that is, in turn, connected by a suitable switch 59 (illustrated as a knife switch) to the positive terminal of the battery 56.

One terminal of each of the resistors or resistance elements 19 of all of the journal-associated resistance cartridges 11a to 11h is connected to the positive battery wire 58 and the opposite terminal in each case, is connected by a corresponding wire 61, 62, 63, 64, 65, 66, 67 and 68 respectively to the contact segments 31 to 38, respectively, in the outer ring of the rotary selector switch 13.

One terminal of each of the resistors 20 of the journal-associated cartridges 11a to 11h is connected to the associated support or screw plug 18 and thus, by reason of the contact of the plug with the grounded journal casing 22, to the negative terminal of the battery 56. The other terminal of each of the resistors 20 is connected by a corresponding wire 71, 72, 73, 74, 75, 76, 77 and 78, respectively, to the contact segments 41 to 48, respectively, in the outer ring of the selector switch 13.

One terminal of the resistor 24 of the master resistance cartridge 12 is connected by a wire 79 to the positive battery wire 58 and the other terminal is connected by a wire 80 to the contact segment 27 of the inner contact ring of selector switch 13 in such a manner as to not interfere with the movement of the contact bridging elements 53 and 54 and the engagement thereof with the contact segments in the concentric rings.

One terminal of the resistor 25 of the master resistance cartridge 12 is connected to the support 18a which is, in turn, connected through a ground connection to the negative terminal of the battery 56, in the manner shown. The other terminal of resistor 25 is connected by a wire 81 to the contact segment 26 of the inner contact ring of the selector switch 13 in such a manner as not to interfere with the movement of the contact bridging elements 53 and 54 and the engagement thereof with the contact segments of the concentric rings.

The disposition of the contact bridging elements 53 and 54 of the rotary selector switch 13 is such that when the contact bridging element 53 connects the contact segment 31 in the outer ring to the contact segment 26 in the inner ring, the contact bridging element 54 simultaneously connects the contact segment 41 in the outer ring to the contact segment 27 in the inner ring. A Wheatstone bridge circuit is thus established, associating the resistance elements 19 and 20 of the journal-associated resistance cartridge 11a with the resistance elements 24 and 25 of the master resistance cartridge 12. This circuit may be traced from the positive terminal of the battery 56 by way of the switch 59 to bus wire 58 where the circuit divides into two parallel branches, one branch extending by way of the resistor 19, wire 61, contact element 31, contact bridging element 53, contact segment 26, wire 81, resistor 25 of the master resistance cartridge 12, and to the negative terminal of the battery 56 through the ground connection shown. The other branch of the circuit extends by way of the wire 79, resistor 24 of the master resistance cartridge 12, wire 80, contact segment 27, contact bridging element 54, contact element 41, wire 71, resistor 20 of resistance cartridge 11a, and thence to the negative or grounded terminal of the battery 56.

In a similar manner, while the contact bridging element 53 connects the contact segment 32 to the contact segment 26 of the selector switch 13, the contact bridging element 54 simultaneously connects the contact segment 42 to the contact segment 27. Upon analysis and tracing of the circuits in the manner previously indicated, it will be seen that the resistors 19 and 20 of the resistance cartridge 11b are thereby associated in a Wheatstone bridge circuit with the resistors 24 and 25 of the master resistance cartridge 12.

It may be demonstrated, similarly, that for each position of the rotor 51 of the rotary selector switch 13 in which the contact bridging element 53 respectively engages the contact segments 33, 34, 35, 36, 37, and 38, the resistors 19 and 20 of the resistance cartridges 11c, 11d, 11e, 11f, 11g and 11h are successively associated in a Wheatstone bridge circuit with the resistors 24 and 25 of the master resistance cartridge 12.

It will be understood that the motor 14 rotates the rotary member 51 of the selector switch 13, continuously, as long as the switch 59 is in closed position; and that the voltage of the battery 56 is likewise imposed on each successive Wheatstone bridge circuit as long as the switch 59 is closed. Opening of the switch 59 stops the motor 14 and prevents drain of current from the battery 56 regardless of the stopped position of the contact bridging elements 53 and 54 of the selector switch 13.

The speed at which the shaft 50 and rotary member 51 of the selector switch 13 is driven by the motor 14 may vary as desired. For example, the speed of the rotary member 51 may be one revolution every two minutes.

Any unbalanced voltage that may exist in each Wheatstone bridge circuit, as it is set up by the selector switch 13, is present across the wires 80 and 81. A so-called pick-up winding 15a of the relay 15 that is connected across wires 80 and 81 is thus energized by a current varying proportionately to the unbalanced voltage on the circuit. The resistors 19 and 20 of the journal-associated resistance cartridges and the resistors 24 and 25 of the master resistance cartridge 12 are so designed with respect to the relative resistance thereof and to the voltage of the battery 56 that the pick-up winding 15a is not sufficiently energized to cause pick-up, that is actuation to closed position, of the front contacts 15c and 15d of the relay 15 unless an abnormally high heat or "hot-box" condition exists in any of the axle journals at the time the Wheatstone bridge circuit including the corresponding journal-associated resistance cartridge is set up.

The relay 15 has a second winding 15b that functions as a "stick" or holding winding for the purpose of maintaining the contacts of the relay in their picked-up or closed position once they are actuated thereto in response to sufficient energization of the pick-up winding 15a. The circuit of the holding winding 15b may be readily traced from the positive battery wire 58 by way of the branch wire 79, a wire 85, a front contact 15c of relay 15, holding winding 15b of the relay 15 and thence to the negative terminal of the battery 56 as through a grounded connection in the manner shown.

The front contact 15d of relay 15 is effective in its picked-up or closed position to establish a circuit for energizing the signal devices 16 and 17 on car "A" as well as signal devices 16a and 17a on the locomotive.

The circuit for the signal devices 16 and 17 on car "A" may be traced from the positive battery wire 58 by way of the branch wire 79, wire 85, front contact 15d of relay 15, a wire 86, and in parallel through the signal devices 16 and 17 to the negative terminal of the battery 56 through ground connections in the manner shown.

The circuit for energizing the signal devices 16a and 17a on the locomotive may be traced from the positive battery wire 58 to the wire 86 as just described, thence by way of an asymmetric device or rectifier 87, which may be of the dry disk or tube type, included in the wire 86, to a train wire 88 which comprises sections on the several cars and locomotive connected through suitable flexible couplings 89. The signal devices 16a and 17a on the locomotive are connected in parallel relation between a branch wire 91 of the train wire 88 on the locomotive and the negative terminal of the battery 56 as through a ground connection in the manner shown.

It will thus be apparent that when the relay 15 is picked-up, the signal devices 16 and 17 on the corresponding car and the signal devices 16a and 17a on the locomotive are simultaneously operated and continue to be operated until the relay 15 is manually restored to its dropped-out position by means of the operating button or handle 92. The relay 15 may also be restored to its dropped-out position by opening the battery control switch 59, thereby interrupting energization of the holding winding 15b of the relay 15.

It is the intention of the arrangement disclosed to necessitate a positive acknowledgement by some member of the train crew in response to the operation of the signal devices on the car or cars and on the locomotive in order to terminate their operation. The likelihood that a hot journal or hot-box condition will be accidentally or negligently disregarded is thus substantially eliminated, for the train crew will not disregard their imposed duty of acknowledging the signal.

It should be apparent that, by reason of the provision of the asymmetric device 87 on each of the cars, the occurrence of a hot-box or hot journal on one car and the consequent actuation of the signal devices 16 and 17 thereon will be ineffective to cause actuation of the corresponding signal devices on another car but will, at the same time, be effective to cause energization of the signal devices on the locomotive. This arrangement, it will be understood, is not a part of my present invention, being heretofore disclosed and claimed in my prior copending application Serial No. 528,709, filed March 30, 1944, and assigned to the assignee of the present application.

Summarizing, it will be seen that I have disclosed herein a novel hot journal alarm apparatus including a plurality of resistance cartridges associated respectively with different axle journals on a car, a so-called master resistance cartridge exposed to ambient temperature within a car, and a continuously operated rotary selector switch for successively and periodically connecting each of the journal-associated resistance cartridges to the master resistance cartridge in a Wheatstone bridge circuit arrangement whereby the unbalanced voltage that may be created in each successively established Wheatstone bridge circuit is effective to cause actuation of signal devices on the corresponding car and on the locomotive simultaneously only upon the occurrence of an abnormal heat condition in any one of the journals. The alarm apparatus is further so constructed and arranged as to cause the signal devices to continue in operation, once actuated in response to an abnormal heat condition in a journal on a car, until the signal is acknowledged by some positive act on the part of some member of the train crew.

Having now described my invention, what I claim as new and desire to secure by Letters Patent, is:

1. Apparatus for signaling the heat condition in any one of a plurality of zones, said apparatus comprising a plurality of resistance units each of which is disposed individually in a corresponding different one of said zones and each unit having two resistance elements uniformly affected by variations of temperature in the corresponding zone, a single additional resistance unit disposed in a certain different zone not subject to the temperature variations occurring in said plurality of zones, said additional resistance unit having two resistance elements uniformly affected by variations of temperature in the said certain different zone, a source of direct current voltage, a rotary selector switch device operative to progressively and periodically connect one of the resistance elements of each of said plurality of resistance units in series relation with one of the resistance elements of said additional resistance unit across said source of voltage and, simultaneously, also connect the other resistance element of the same one of said plurality of resistance units in series relation with the other resistance element of said additional resistance unit across said source of voltage, said resistance elements being further so disposed that each constitutes one arm of a Wheatstone bridge arrangement and that the simultaneous and uniform variation of resistance of both of the resistance elements of any one of said plurality of resistance units produces an unbalanced voltage condition of the bridge arrangement, and electroresponsive means operatively responsive to a predetermined unbalanced voltage produced on the Wheatstone bridge arrangement.

2. Apparatus for selectively and progressively signaling the heat condition in any one of a plurality of different zones, said apparatus comprising a plurality of units each of which is individually disposed in a corresponding different one of said zones and includes two resistance elements uniformly affected by variations of temperature in the corresponding zone, an additional unit disposed in a certain different zone subject only to variations of ambient temperature, said additional unit having two resistance elements both uniformly affected by the temperature condition in said certain different zone, a source of direct current voltage, a rotary selector switch device including a rotary contact mechanism, said rotary selector switch device being operative when the rotary contact mechanism rotates continuously in one direction to cause one of the resistance elements of said certain unit to be connected across said voltage source in series relation with one of the resistance elements of each one of said plurality of units progressively and repeatedly and also to simultaneously cause the other of said resistance elements of said additional unit to be connected across said voltage source in series relation with the remaining resistance element of each of said plurality of units progressively and repeatedly whereby to cause a plurality of Wheatstone bridge arrangements to be progressively and repeatedly established in each of which the two resistance elements of the said additional unit are always included, the connections established by said rotary selector switch device being such that the simultaneous and uniform variation of resistance of both of the resistance elements of any one of said plurality of units functions to produce an unbalanced voltage condition of the corresponding bridge arrangement substantially in accordance with the degree of variation of the temperature in the corresponding zone with respect to the temperature in said certain different zone, and electroresponsive means operatively responsive only to an unbalanced voltage exceeding a certain value produced on any one of said Wheatstone bridge arrangements.

GEORGE K. NEWELL.

REFERENCES CITED

The following references are of record in the file of this patent:

UNITED STATES PATENTS

| Number | Name | Date |
|---|---|---|
| 903,090 | Hopkins | Nov. 3, 1908 |
| 1,267,757 | Gibson | May 28, 1918 |
| 1,537,281 | Wunsch | May 12, 1925 |

FOREIGN PATENTS

| Number | Country | Date |
|---|---|---|
| 502,711 | Great Britain | Mar. 23, 1939 |
| 539,543 | Great Britain | Sept. 16, 1941 |